(12) United States Patent
Egawa et al.

(10) Patent No.: US 7,258,814 B2
(45) Date of Patent: Aug. 21, 2007

(54) COOLANT COMPOSITION AND METHODS OF USE THEREOF

(75) Inventors: Hiroshi Egawa, Gifu (JP); Nobuyuki Kaga, Gifu (JP)

(73) Assignee: Shishiai-Kabushikigaisha, Gifu (JP)

( * ) Notice: Subject to any disclaimer, the term of this patent is extended or adjusted under 35 U.S.C. 154(b) by 0 days.

(21) Appl. No.: 11/641,581

(22) Filed: Dec. 19, 2006

(65) Prior Publication Data

US 2007/0096054 A1    May 3, 2007

Related U.S. Application Data

(63) Continuation of application No. 11/395,106, filed on Mar. 31, 2006, now abandoned, which is a continuation-in-part of application No. PCT/JP03/16647, filed on Dec. 24, 2003.

(30) Foreign Application Priority Data

Oct. 1, 2003 (JP) .................. 2003-342715

(51) Int. Cl.
C09K 5/00 (2006.01)
C23F 11/12 (2006.01)

(52) U.S. Cl. .................. 252/76; 252/70; 252/71; 252/74; 252/75

(58) Field of Classification Search .................. 252/70, 252/71, 74, 75, 76
See application file for complete search history.

(56) References Cited

U.S. PATENT DOCUMENTS

| | | | |
|---|---|---|---|
| 2,959,547 A | 11/1960 | Brillhart | |
| 4,105,405 A | 8/1978 | Wehle et al. | |
| 4,418,231 A | 11/1983 | Pamer | |
| 5,454,967 A | 10/1995 | Pfitzner et al. | |
| 5,723,061 A | 3/1998 | Ciardi et al. | |
| 5,766,506 A * | 6/1998 | Mendoza et al. | 252/76 |
| 5,772,912 A | 6/1998 | Lockyer | |
| 6,040,073 A | 3/2000 | Okamoto | |
| 6,042,955 A | 3/2000 | Okamoto | |
| 6,214,486 B1 | 4/2001 | Okamoto | |
| 6,309,559 B1 | 10/2001 | Minks et al. | |
| 6,391,257 B1 | 5/2002 | Woyciesjes | |
| 6,585,933 B1 * | 7/2003 | Ehrhardt et al. | 422/16 |
| 6,646,082 B2 * | 11/2003 | Ghosh et al. | 526/262 |
| 6,802,988 B1 * | 10/2004 | Wenderoth et al. | 252/73 |
| 6,814,885 B2 * | 11/2004 | Woodward et al. | 252/180 |
| 2002/0068360 A1 | 6/2002 | Brockbank et al. | |
| 2006/0237685 A1 * | 10/2006 | Egawa et al. | 252/71 |
| 2006/0237686 A1 * | 10/2006 | Egawa et al. | 252/71 |

FOREIGN PATENT DOCUMENTS

| | | | |
|---|---|---|---|
| EP | 0652305 A1 | 10/1995 | |
| EP | 0739965 A1 | 10/1996 | |
| EP | 1081250 A1 | 3/2001 | |
| JP | 2-31894 A * | 2/1990 | |
| JP | 2292386 | 12/1990 | |
| JP | 7-173651 A * | 7/1995 | |
| JP | 2000008027 A2 | 1/2000 | |
| JP | 2000-219981 A * | 8/2000 | |
| JP | 2000239658 A | 9/2000 | |
| JP | 2001072967 | 3/2001 | |
| JP | 2001279235 | 10/2001 | |
| JP | 2002322467 A * | 11/2002 | |
| JP | 2002-371270 A * | 12/2002 | |
| JP | 2003213465 A | 7/2003 | |
| JP | 2004143191 A | 5/2004 | |
| WO | WO 00/11102 | 3/2000 | |
| WO | WO 01/23495 A1 | 9/2000 | |
| WO | WO 01/02511 A1 | 1/2001 | |
| WO | WO 0178505 | 10/2001 | |
| WO | 1262535 A1 | 4/2002 | |

OTHER PUBLICATIONS

International Search Report for International Application No. PCT/JP2003/016647, Dec. 24, 2003, (1 page).

Mueller, Sherry A. et al., "Leaching of Ions from Fuel Cells Vehicle Cooling System and Their Removal to Maintain Low Conductivity,"SAE Technical Paper Series, Mar. 3-6, 2003, 7 pgs., Detroit, U.S.A..

* cited by examiner

*Primary Examiner*—Anthony J. Green
(74) *Attorney, Agent, or Firm*—Patterson, Thuente, Skaar & Christensen, P.A.

(57) ABSTRACT

The present invention provides a coolant composition having a glycol as a main component, which prevents iron and aluminum from being corroded, and in particular, has excellent corrosion preventing properties for aluminum and aluminum alloys at high temperatures, and the coolant composition is characterized by containing: (a) 0.1-10 % by weight of at least one component selected from among aromatic monobasic acids and the salts thereof; (b) 0.0001-0.1 % by weight of at least one component selected from among strontium compounds, magnesium compounds and calcium compounds; and (c) 0.01-1.0 % by weight of 2-phosphonobutane-1,2,4-tricarboxylic acid or the salt thereof.

9 Claims, No Drawings

COOLANT COMPOSITION AND METHODS OF USE THEREOF

CROSS REFERENCE TO RELATED PATENT APPLICATIONS

This application is a continuation of application Ser. No. 11/395,106 filed Mar. 31, 2006 now abandoned, which is a continuation-in-part of international patent application PCT/JP2003/016647 filed Dec. 24, 2003, which claims priority to Japanese Patent Application No. 2003-342715 filed Oct. 1, 2003, which applications are hereby claimed as priority documents and are hereby incorporated herein by reference. This application is related to U.S. patent application Ser. No. 11/121,358 filed May 4, 2005 and U.S. patent application Ser. No. 11/330,015 filed Jan. 11, 2006.

TECHNICAL FIELD

The present invention relates to a coolant composition which is used for a coolant mainly for internal combustion engines. In particular, the invention relates to a coolant composition which is excellent in preventing corrosion of iron and aluminum, specifically, corrosion preventing properties for aluminum and aluminum alloys at high temperatures exceeding 150° C.

BACKGROUND ART

Metals such as aluminum, aluminum alloys, cast iron, steel, brass, solder and copper are used in cooling systems for internal combustion engines. Particularly in recent years, a large amount of aluminum or aluminum alloys have been used for parts in cooling systems, for the purpose of reducing the weight of vehicle.

SUMMARY AND DETAILED DESCRIPTION OF THE INVENTION

These metals are corroded through contact with water or air. In order to prevent this, coolant compositions which are applied to cooling systems of internal combustion engines, include a metal corrosion inhibitor, such as phosphate, amine salt, borate, nitrite, silicate or an organic acid. In particular, phosphate has excellent corrosion preventing properties for iron and aluminum, and therefore, is used in many coolant compositions.

However, phosphate reacts with hard water components and creates precipitate, and therefore, when diluted with hard water, a large amount of precipitate is created. Creation of precipitate reduces the corrosion preventing performance of the coolant, and in addition, the created precipitate settles along the circulation path of the cooling system, and thus, there is a risk that a state where the cooling system is clogged may be caused.

Meanwhile, borate tends to corrode aluminum and aluminum alloy, and silicate is inferior in stability in liquids and is easily gelled, that is, easily separates in the case where the temperature or pH changes, or when another salt coexists, and thereby, a problem arises, such that the corrosion preventing performance is reduced.

As for amine salt and nitrite, there is a possibility that nitrosamine, which is hazardous for human body, may be generated when these coexist in the coolant.

As described above, substances which are known as metal corrosion inhibitors that are effective for preventing corrosion of iron and aluminum all have various problems when used, and therefore, development of a corrosion inhibitor exhibiting excellent corrosion preventing properties for iron and aluminum has been desired.

As a corrosion inhibitor solving the above described problems, 2-phosphonobutane-1,2,4-tricarboxylic acid and the water soluble salt thereof have been proposed. This corrosion inhibitor exhibits excellent anti-corrosion against contact between different kinds of metals, in particular, contact corrosion between aluminum alloys, cast iron and solder and other kinds of metal, and furthermore, has excellent anti-corrosion performance against corrosion of heat transfer surfaces of aluminum. In addition, this corrosion inhibitor has only a small risk of causing eutrophication in rivers and is low in toxicity, and thus, is a corrosion inhibitor causing little pollution.

The present applicant has proposed a coolant composition using 2-phosphonobutane-1,2,4-tricarboxylic acid having such excellent performance. This coolant composition is characterized by including phosphate, nitrate, benzoate and triazole, together with 2-phosphonobutane-1,2,4-tricarboxylic acid or the water soluble salt thereof (see Japanese Unexamined Patent Publication H7 (1995)-173651).

However, there is a problem with this coolant composition, such that the amount of corrosion was high in the testing of corrosion properties of heat transfer surfaces of aluminum at high temperatures exceeding 150° C.

The present invention is made in view of the above described situation, and an object thereof is to provide a coolant composition which is excellent in preventing iron and aluminum from being corroded, in particular, corrosion preventing properties of aluminum and aluminum alloys at high temperatures.

In order to achieve the above described object, according to the gist of the present invention, a coolant composition having a glycol as a main component, characterized by containing: (a) 0.1-10% by weight of at least one component selected from among aromatic monobasic acids and the salts thereof, (b) 0.0001-0.1% by weight of at least one component selected from among strontium compounds, magnesium compounds and calcium compounds; and (c) 0.01-1.0% by weight of 2-phosphonobutane-1,2,4-tricarboxylic acid or the salt thereof, is provided.

As the glycol which is a main component of the coolant composition (hereinafter simply referred to as composition) according to the present invention, ethylene glycol, propylene glycol, 1,3-butylene glycol, hexylene glycol, diethylene glycol, glycerine and the like can be cited, and from among these, ethylene glycol and propylene glycol are desirable, from the point of view of chemical stability, ease of handling, price, availability and the like.

The composition of the present invention contains the above described three components (a) to (c) in the above described main component, so that effects of preventing iron and aluminum from being corroded, particularly, effects of providing excellent corrosion preventing properties for aluminum and aluminum alloys at high temperatures exceeding 150° C. are gained as synergetic effects of these three components (a) to (c).

As the aromatic monobasic acid or the salt thereof, which is component (a), benzoic acids, such as benzoic acid, nitrobenzoic acid and hydroxybenzoic acid, alkyl benzoic acids, such as p-toluic acid, p-ethyl benzoic acid, p-propyl benzoic acid, p-isopropyl benzoic acid and p-tert-butyl benzoic acid, alkoxy benzoic acids of which the general formula can be represented by $RO-C6H_4-COOH$ (R is an alkyl group containing any of $C_1$ to $C_5$), cinnamic acid, alkyl cinnamic acid and alkoxy cinnamic acid, of which the general formula can be represented by $R-C_6H_4-CH=COOH$ (R is an alkyl group or an alkoxy group containing any of $C_1$ to $C_5$), as well as alkali metal salts, ammonium salts and amine salts of these, can be cited as examples. From among these, benzoic acid, p-toluic acid and p-tert butyl benzoic acid are excellent in corrosion preventing performance in aluminum and aluminum alloys, and it is desirable for at least one from among these to be included.

Component (a) is included in a range from 0.1-10% by weight. This is because in the case where the content of component (a) is outside the above described range, sufficient corrosion preventing performance cannot be gained in aluminum and aluminum alloys, or use thereof becomes uneconomical.

As the strontium compound, which is component (b), strontium oxide, strontium hydroxide, strontium chloride, strontium fluoride, strontium iodide, strontium sulfate, strontium nitrate, strontium titanate, strontium borate, strontium tungstate, strontium phosphate, strontium dihydrogen phosphate, strontium formate, strontium acetate, strontium propionate, strontium butyrate, strontium valerate, strontium laurate, strontium stearate, strontium oleate, strontium glutamate, strontium lactate, strontium succinate, strontium malate, strontium tartrate, strontium maleate, strontium citrate, strontium oxalate, strontium malonate, strontium sebacate, strontium benzoate, strontium phthalate, strontium salicylate and strontium mandelate can be cited as examples, and from among these, strontium nitrate, strontium sulfate and strontium phosphate are particularly desirable.

In addition, as the magnesium compound, inorganic acid magnesium compounds, such as magnesium chloride, magnesium oxide, magnesium hydroxide, magnesium carbonate, magnesium nitrate, magnesium sulfate, magnesium titanate, magnesium tungstate, magnesium borate, magnesium phosphate, magnesium dihydrogen phosphate, magnesium ammonium phosphate, magnesium chromate, magnesium permanganate, magnesium fluoride and magnesium iodide, and organic acid magnesium compounds and the like, such as magnesium formate, magnesium acetate, magnesium propionate, magnesium butyrate, magnesium valerate, magnesium laurate, magnesium stearate, magnesium oleate, magnesium glutamate, magnesium lactate, magnesium succinate, magnesium malate, magnesium tartrate, magnesium hydrogen tartrate, magnesium maleate, magnesium citrate, magnesium oxalate, magnesium malonate, magnesium sebacate, magnesium benzoate, magnesium phthalate, magnesium salicylate and magnesium mandelate can be cited as examples.

In addition, as the calcium compound, formate, acetate, propionate, butyrate, valerate, laurate, stearate, oleate, glutamate, lactate, succinate, malate, tartrate, maleate, citrate, oxalate, malonate, sebacate, benzoate, phthalate, salicylate, mandelate, oxide, hydroxide, permanganate, chromate, fluoride, iodide, carbonate, nitrate, sulfate, titanate, tungstate, borate, phosphate, dihydrogen phosphate and the like can be cited.

Component (b), which is made of at least one compound selected from among the above described strontium compounds, magnesium compounds and calcium compounds, is included in a range from 0.0001-0.1% by weight. In the case where the content of any of these compounds is below 0.0001% by weight, sufficient effects of "preventing iron and aluminum from being corroded, particularly, of effectively suppressing corrosion of heat transfer surfaces of aluminum and aluminum alloys at high temperatures" cannot be expected, and in the case where the content exceeds 0.1% by weight, no extra effects are gained for the exceeding amount, and use of the compound is uneconomical.

2-phophsorobutane-1,2,4-tricarboxylic acid or the salt thereof, preferably sodium salt or potassium salt, which is component (c), is a component which provides effects of preventing aluminum and aluminum alloys from being corroded, particularly, effects of increasing, corrosion preventing properties at high temperatures, and component (c) works to suppress corrosion of aluminum and aluminum alloys, together with the above described component (b). Furthermore, component (c) works to suppress creation of precipitate as a result of reaction between phosphate and a hard water component in the liquid when phosphate coexists.

This component (c) is included in a range from 0.01-1.0% by weight. This is because content outside this range does not provide the above described effects or makes the use of the component uneconomical.

It is desirable for the composition of the present invention to adopt such a form as not to contain silicate or borate. This is because borate is corrosive against aluminum and aluminum alloys while silicate is inferior in stability in a liquid, so that it is easily gelled, that is, easily separates in the case where the temperature or pH changes or when another salt coexists, and as a result, a problem arises, such that the corrosion preventing performance is lowered.

Furthermore, in the case of the composition of the present invention, such a form as not to include molybdate can be adopted. In this case, there is the merit that a negative effect, such that oxidation and deterioration in glycol are accelerated by the molybdate, can be prevented.

The composition of the present invention can adopt such a form as to contain phosphate in addition to the above described three components (a) to (c). As the phosphate, orthophosphate, pyrophosphate, trimetaphosphate and tetrametaphosphate can be cited, and one or two or more from among these is included, and thereby, corrosion preventing properties for iron and aluminum, particularly, aluminum and aluminum alloys, are further enhanced. As for the content of phosphate, it is desirable for phosphate to be included in a range from 0.01-2.0% by weight.

In addition, the composition of the present invention can adopt such a form as to include a triazole having excellent corrosion preventing properties for metals, particularly copper. As the triazole, benzotriazole, tolyltriazole, 4-phenyl-1,2,3-triazole, 2-naphto triazole and 4-nitrobenzo triazole can be cited as examples. As for the content of the triazole, a range from 0.05-1.0% by weight is desirable.

Here, the composition of the present invention may include an antifoaming agent, a coloring agent or the like in addition to the above described components.

EFFECTS OF THE INVENTION

The composition of the present invention contains (a) 0.1-10% by weight of at least one component selected from among aromatic monobasic acids or the alkali metal salts there of; (b) 0.0001-0.1% by weight of at least one component selected from among strontium compounds, magnesium compounds and calcium compounds; and (c) 0.01-1.0% by weight of 2-phosphonobutane-1,2,4-tricarboxylic acid, and therefore, effects of preventing iron and aluminum from being corroded, particularly, effects of providing excellent corrosion preventing properties for aluminum and aluminum alloys at high temperatures exceeding 150° C. can be gained.

BEST MODE FOR CARRYING OUT THE INVENTION

In the following, the composition of the present invention is described in further detail. The following Table 1 respectively shows an example which includes three components (a) to (c) and does not include phosphate (Embodiment 1), as well as an example which includes three components (a) to (c) and includes phosphate (Embodiment 2) as preferred embodiments, and an example which includes only component (a) and does not include the other two components (b) and (c) (Comparative Example 1), an example which includes two components (b) and (c) and includes an aliphatic monobasic acid instead of component (a) (Comparative Example 2), an example which includes two components (b) and (c) and includes an aliphatic dibasic acid instead of component (a) (Comparative Example 3), and an example which includes only component (a) and includes phosphate (Comparative Example 4) for comparison.

TABLE 1

| Item | Embodiment 1 | Embodiment 2 | Comparative Example 1 | Comparative Example 2 | Comparative Example 3 | Comparative Example 4 |
|---|---|---|---|---|---|---|
| p-tert-butyl benzoic acid | 4.0 | 4.0 | 4.0 | — | — | 4.0 |
| Pentanoic acid | — | — | — | 4.0 | — | — |
| Adipic acid | — | — | — | — | 4.0 | — |
| Magnesium nitrate (hexahydrate) | 0.01 | 0.01 | — | 0.01 | 0.01 | — |
| 2-phophonobutane-1,2,4-tricarboxylic acid | 0.08 | 0.08 | — | 0.08 | 0.08 | — |
| Phosphoric acid | — | 0.2 | — | — | — | 0.2 |
| Tolyltriazole | 0.3 | 0.3 | 0.3 | 0.3 | 0.3 | 0.3 |
| Potassium hydroxide | (1) | (1) | (1) | (1) | (1) | (1) |
| Water | 2 | 2 | 2 | 2 | 2 | 2 |
| Ethylene glycol | Rest | Rest | Rest | Rest | Rest | Rest |

Note:
(1) indicates the amount that is required to neutralize the coolant composition so that the pH of each becomes up to 8.0

High temperature metal corrosion test was performed on the respective samples of the above described Embodiments 1 and 2, as well as Comparative Examples 1 to 4, and a change of mass (mg/cm$^2$) was confirmed in each metal, and whether or not there was abnormality in the appearance was confirmed. The results are shown in Table 2. Here, metal corrosion test was performed on the basis of the standard of metal corrosion property of JIS K 2234, and as the metals which to be subjected to this test, respective test pieces of cast aluminum, cast iron, steel, brass, solder and copper were used. In addition, test was carried out under conditions of 100° C. for 1000 hours with no ventilation in a pressurized air-tight container.

TABLE 2

| Item | | Embodiment 1 | Embodiment 2 | Comparative Example 1 | Comparative Example 2 | Comparative Example 3 | Comparative Example 4 |
|---|---|---|---|---|---|---|---|
| Change of mass mg/cm$^3$ | Cast aluminum | −0.03 | +0.01 | −0.12 | −1.04 | −0.31 | −0.04 |
| | Cast iron | −0.01 | +0.02 | +0.01 | −18.6 | −12.41 | −0.06 |
| | Steel | +0.01 | 0.00 | −0.01 | −0.23 | −0.36 | −0.02 |
| | Brass | −0.04 | −0.02 | −0.03 | −0.33 | −0.24 | 0.00 |
| | Solder | −0.08 | −0.06 | −0.07 | −15.40 | −1.01 | −0.08 |
| | Copper | −0.05 | −0.04 | −0.04 | −0.23 | −0.16 | −0.04 |
| Appearance of test piece | | No abnormality | No abnormality | cast aluminum: local corrosion | Cast aluminum: tarnish Cast iron: General Corrosion Steel: local corrosion Solder: General Corrosion | Cast aluminum: local corrosion Cast iron: General corrosion Steel: local corrosion Solder: tarnish | No abnormality |

It can be confirmed from Table 2 that the samples according to Embodiments 1 and 2 both had excellent corrosion preventing properties for metals, particularly cast aluminum, and that change in the appearance was small. Meanwhile, it can be confirmed that all of Comparative Examples 1 to 4, excluding Comparative Example 4, were poor in corrosion preventing properties.

Next, high temperature cast aluminum transfer surface corrosion test was performed on the respective samples of the above described Embodiments 1 and 2, as well as Comparative Examples 1 to 4, and the change of mass (mg/cm$^2$) was measured, and whether or not there was abnormality in the appearance was confirmed. The results are shown in Table 3. Here, high temperature cast aluminum heat transfer surface corrosion test was performed in compliance with the standard of corrosion property of cast aluminum at heat-transfer surface of JIS K 2234. The test temperature was 160° C., and the heat-resistant glass cell was replaced by a cell made of made of stainless steel.

therefore, when distilled with hard water, a large amount of precipitate is created. Creation of precipitate reduces the corrosion preventing performance of the coolant, and in addition, the created precipitate settles along the circulation path in the cooling system, and thus, there is a risk that a state where the cooling system is clogged may be caused. The present testing allows for confirmation of the extent of the performance of suppressing reaction with a hard water component (hard water stability), and synthetic hard water where 48 mg of sodium sulfate, 165 mg of sodium chloride, 138 mg of sodium hydrogen carbonate and 275 mg of calcium chloride are dissolved in distilled water of 1 l was used, in such a manner that the respective samples of Embodiment 2 and Comparative Example 4 were diluted to a concentration of 50% with this synthetic hard water, so as to be used as a test liquid, and whether or not there is abnormality (precipitate) in the appearance of the test liquid after 24 hours at 88° C. was confirmed for this test liquid. The results are shown in Table 4.

TABLE 3

| Item | Embodiment 1 | Embodiment 2 | Comparative Example 1 | Comparative Example 2 | Comparative Example 3 | Comparative Example 4 |
|---|---|---|---|---|---|---|
| Change of mass mg/cm$^2$ | −0.3 | −0.2 | −0.8 | −3.4 | −6.4 | −17.6 |
| Appearance of test piece | No abnormality | No abnormality | No abnormality | General corrosion | General corrosion | General corrosion |

It can be confirmed from Table 3 that the respective examples of Embodiments 1 and 2, as well as Comparative Example 1, had a small change of mass in comparison with Comparative Examples 2 to 4, and that specifically, Embodiments 1 and 2 had an amount of corrosion so high as to exceed −0.5, and thus, had excellent corrosion preventing properties for the cast aluminum heat transfer surface at high temperatures.

Next, hard water stability testing was performed on Embodiment 2 and Comparative Example 4, which both include phosphate. As described above, phosphate reacts with a hard water component so as to create precipitate, and

TABLE 4

| Item | Embodiment 2 | Comparative Example |
|---|---|---|
| Appearance of liquid after testing | No abnormality | Precipitation Deposition |

As is clear from Table 4, creation of precipitate was observed in Comparative Example 4, while that there was no precipitation and excellent hard water stability was observed in Embodiment 2.

The invention claimed is:

1. A coolant composition comprising a glycol as a main ingredient,
   (a) 0.1-10% by weight of at least one ingredient selected from the group consisting of aromatic monobasic acids and salts thereof;
   (b) 0.0001-0.1% by weight of at least one ingredient selected from the group consisting of strontium compounds, magnesium compounds and calcium compounds; and
   (c) 0.01-1.0% by weight of 2-phosphonobutane-1,2,4-tricarboxylic acid or a salt thereof.

2. The coolant composition of claim 1, wherein essentially no silicate and essentially no borate are present.

3. The coolant composition of claim 1 wherein said aromatic monobasic acid is p-tert butyl benzoic acid, p-toluic acid or benzoic acid.

4. The coolant composition of claim 2 wherein said aromatic monobasic acid is p-tert butyl benzoic acid, p-toluic acid and benzoic acid.

5. The coolant composition of claim 1 further comprising about 0.01-2.0% by weight of phosphate.

6. The coolant composition of claim 2, further comprising about 0.01-2.0% by weight of phosphate.

7. The coolant composition of claim 3, further comprising about 0.01-2.0% by weight of phosphate.

8. The coolant composition of claim 4, further comprising about 0.01-2.0% by weight of phosphate.

9. The coolant composition of claim 1, further comprising about 0.05-1.0% by weight of triazole.

* * * * *